United States Patent
Chen et al.

(10) Patent No.: US 10,382,969 B2
(45) Date of Patent: Aug. 13, 2019

(54) RESOURCE ALLOCATION DESIGN FOR LOW COST MACHINE-TYPE COMMUNICATION UE

(71) Applicant: MEDIATEK INC., Hsinchu (TW)

(72) Inventors: Hua-Min Chen, Beijing (CN); Tao Chen, Beijing (CN); Min Wu, Beijing (CN)

(73) Assignee: HFI Innovation INC., HsinChu (TW)

( * ) Notice: Subject to any disclaimer, the term of this patent is extended or adjusted under 35 U.S.C. 154(b) by 0 days.

(21) Appl. No.: 15/681,740

(22) Filed: Aug. 21, 2017

(65) Prior Publication Data
US 2017/0347268 A1 Nov. 30, 2017

Related U.S. Application Data

(63) Continuation of application No. PCT/CN2015/076306, filed on Apr. 10, 2015.

(51) Int. Cl.
*H04W 4/00* (2018.01)
*H04W 16/02* (2009.01)
(Continued)

(52) U.S. Cl.
CPC .......... *H04W 16/02* (2013.01); *H04B 1/7143* (2013.01); *H04L 5/0044* (2013.01);
(Continued)

(58) Field of Classification Search
CPC ... H04W 16/02; H04W 72/0453; H04W 4/70; H04W 72/1289; H04B 1/7143; H04L 5/0044; H04L 5/0053; H04L 5/0007
See application file for complete search history.

(56) References Cited

U.S. PATENT DOCUMENTS

| | | |
|---|---|---|
| 2010/0182968 A1 | 7/2010 | Ojala et al. .................. 370/329 |
| 2011/0268070 A1 | 11/2011 | Guan et al. ................... 370/329 |

(Continued)

FOREIGN PATENT DOCUMENTS

| | | |
|---|---|---|
| CN | 101291512 A | 4/2007 |
| WO | WO2009030555 A1 | 9/2007 |

OTHER PUBLICATIONS

International Search Report and Written Opinion of International Search Authority for PCT/CN2015/076306 dated Jan. 12, 2016 (11 pages).

(Continued)

*Primary Examiner* — Barry W Taylor
(74) *Attorney, Agent, or Firm* — Imperium Patent Works; Helen Mao

(57) ABSTRACT

Methods and apparatus of resource allocation (RA) for low cost machine communication type (LC-MTC) user equipments (UEs) are provided. A UE obtains one or multiple sets of resources in a mobile communication network. Each set of resources belongs to a narrow sub-band in a wider channel bandwidth, wherein the narrow sub-band comprises a plurality of contiguous physical resource blocks (PRBs). The UE determines a first set of resources from the one or multiple sets of resources based on a physical layer control signaling and transmits or receives radio signals using the first set of resources within a predefined duration. In a coverage extension mode, the UE determines a second set of resources according to a hopping pattern, while the first and the second sets of resources are occupied for transmission at different radio subframes. The UE then transmits or receives radio signals using the second set of resources.

19 Claims, 15 Drawing Sheets

(51) Int. Cl.
    *H04W 72/04*     (2009.01)
    *H04B 1/7143*     (2011.01)
    *H04L 5/00*     (2006.01)
    *H04W 4/70*     (2018.01)
    *H04W 72/12*     (2009.01)

(52) U.S. Cl.
    CPC ....... *H04L 5/0053* (2013.01); *H04W 72/0453* (2013.01); *H04L 5/0007* (2013.01); *H04W 4/70* (2018.02); *H04W 72/1289* (2013.01)

(56) References Cited

U.S. PATENT DOCUMENTS

| | | | | |
|---|---|---|---|---|
| 2016/0127918 | A1* | 5/2016 | Yi | H04W 84/047 |
| | | | | 370/329 |
| 2016/0345118 | A1* | 11/2016 | Oh | H04W 4/70 |
| 2018/0176753 | A1* | 6/2018 | Kim | H04L 5/00 |
| 2018/0227897 | A1* | 8/2018 | Yeo | H04J 11/00 |

OTHER PUBLICATIONS

EPO, search report for the EP patent application 15888187.0 dated Jun. 15, 2018 (14 pages).

R1-150018 3GPP TSG RAN WG1 Meeting #80, Ericsson, "DCI format design for MTC", Athens, Greece, Feb. 9-13, 2015 (4 pages). *Section 1-2*.

R1-150428 3GPP TSG-RAN WG1 Meeting #80, Sony, "MTC Operation with a Narrowband PDCCH", Athens, Greece, Feb. 9-13, 2015 (16 pages). *Section 1; figures 1-2*, *Section 3; figure 8*.

R1-150286 3GPP TSG RAN WG1 Meeting #80, NEC, "Frequency hopping schemes for LTE Rdl-13 MTC", Athens, Greece, Feb. 9-13, 2015 (4 pages). *Section 3; figure 1*.

R1-150400 3GPP TSG RAN WG1 Meeting #80, Huawei et al., "Supporting FDM for MTC UEs and other UEs", Athens, Greece, Feb. 9-13, 2015 (4 pages). *Section 4*.

* cited by examiner

| BW (MHz) | 1.4 | 3 | 5 | 10 | 15 | 20 |
|---|---|---|---|---|---|---|
| PRB number | 6 | 15 | 25 | 50 | 75 | 100 |
| Higher layer: narrow band is with 6 PRBs(bit) | 0 | 4*N_sub | 5*N_sub | 6*N_sub | 7*N_sub | 7*N_sub |
| Higher layer: BW of narrow band is Configurable(bit) | 3*N_sub | 7*N_sub | 8*N_sub | 9*N_sub | 10*N_sub | 10*N_sub |
| Narrow band indication (bit) | 0 | 2 (N_sub=4) | 3 (N_sub=5) | 4 (N_sub=9) | 4 (N_sub=13) | 5 (N_sub=17) |
| RA within narrow band(bit) | 5 | 5 | 5 | 5 | 5 | 5 |

RESOURCE OVERHEAD UNDER
EMBODIMENT #1

FIG. 5

EMBODIMENT #1 WITHOUT HOPPING

EMBODIMENT #1 WITH HOPPING

EMBODIMENT #1 WITH HOPPING

EMBODIMENT #2 WITH HOPPING

EMBODIMENT #2 WITH HOPPING

| BW (MHz) | 1.4 | 3 | 5 | 10 | 15 | 20 |
|---|---|---|---|---|---|---|
| PRB number | 6 | 15 | 25 | 50 | 75 | 100 |
| (a)PRB number within a sub-band | 5 | 5 | 5 | 5 | 5 | 5 |
| (b)Sub-band indexing | 0 | 2 | 3 | 4 | 4 | 5 |
| (c) Overall RA size (a+b) | 5 | 7 | 8 | 9 | 9 | 10 |

RESOURCE OVERHEAD UNDER
EMBODIMENT #3

FIG. 11

EMBODIMENT #3 WITHOUT HOPPING

EMBODIMENT #3 WITH HOPPING

| BW (MHz) | 1.4 | 3 | 5 | 10 | 15 | 20 |
|---|---|---|---|---|---|---|
| PRB number | 6 | 15 | 25 | 50 | 75 | 100 |
| (a) PRB number within a sub-band | 5 | 5 | 5 | 5 | 5 | 5 |
| (b) half band indication | 0 | 1 | 1 | 1 | 1 | 1 |
| (c) Narrow band indication | 0 | 1 | 2 | 3 | 3 | 4 |
| (d) Overall RA size (a+b+c) | 5 | 7 | 8 | 9 | 9 | 10 |

RESOURCE OVERHEAD UNDER
EMBODIMENT #4
(NO HOPPING + ONE NARROW SUB-BAND)

FIG. 14

FIG. 15 — EMBODIMENT #4 WITHOUT HOPPING

RESOURCE ALLOCATION DESIGN FOR LOW COST MACHINE-TYPE COMMUNICATION UE

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/076306, with an international filing date of Apr. 10, 2015. This application is a continuation of International Application No. PCT/CN2015/076306, which is pending as of the filing date of this application, and the United States is a designated state in International Application No. PCT/CN2015/076306. The disclosure of each of the foregoing documents is incorporated herein by reference.

TECHNICAL FIELD

The disclosed embodiments relate generally to Machine type communications, and, more particularly, to resource allocation for low cost MTC UE.

BACKGROUND

Machine-Type Communication (MTC) is an important revenue stream for operators and has a huge potential from the operator perspective. Lowering the cost of MTC user equipment (UEs)/devices is an important enabler for the implementation of the concept of "internet of things" (IOT). Many MTC devices are targeting low-end (low average revenue per user, low data rate) applications that can be handled adequately by GSM/GPRS. In order to ensure that there is a clear business benefit to MTC UE vendors and operators for migrating low-end MTC devices from GSM/GPRS to LTE networks, a new type of terminal, i.e. a low cost (LC) MTC UE, is introduced in Rel-11. The cost of the LC-MTC UEs is tailored for the low-end of the MTC market to be competitive with that of GSM/GPRS terminals. The LC-MTC UEs are characterized by: 1) One Rx antenna; 2) Downlink and uplink maximum TBS size of 1000 bits; 3) Bandwidth reduction—resources for each channel transmission are limited to contiguous 6 PRBs (1.4 MHz) for cost reduction, and 4) Coverage enhancement—some applications of LC-MTC UEs will require 15-20 dB coverage extension and repeated transmission is a common technique to compensate penetration losses.

A solution is provided to schedule resources for LC-MTC UEs efficiently and to support frequency hopping to improve performance in coverage extension mode.

SUMMARY

Methods and apparatus of resource allocation (RA) for low cost machine communication type (LC-MTC) user equipments (UEs) are provided.

A UE obtains one or multiple sets of resources in a mobile communication network. Each set of resources belongs to a narrow sub-band in a wider channel bandwidth, wherein the narrow sub-band comprises a plurality of contiguous physical resource blocks (PRBs). The UE determines a first set of resources from the one or multiple sets of resources based on a physical layer control signaling and transmits/receives radio signals using the first set of resources within a predefined duration. In a coverage extension mode, the UE determines a second set of resources according to a hopping pattern, after performing a transmission/reception on the first set of resources. The first and the second sets of resources are used in different radio subframes at time domain. The UE then transmits or receives radio signals using the second set of resources. In a coverage extension mode, the UE determines a second set of resources according to a hopping pattern. The first and the second sets of resources belong to different radio subframes. The UE then transmits or receives radio signals using the second set of resources.

A base station determines one or multiple sets of resources in a mobile communication network. Each set of the resources belongs to a narrow sub-band in a wider channel bandwidth, wherein the narrow sub-band comprises a plurality of contiguous PRBs. The base station allocates a first set of resources from the one or multiple sets of resources for a UE. The base station transmits a physical layer control signaling to the UE. The physical layer control signaling comprises a resource indicator indicating a sub-band index, a logical resource start index, and a resource size. In one case, for multiple UEs, the resource size for each set could be the same, or for the same UE the resource size for each set could be the same, or different at different subframes. In a coverage extension mode, the base station determines a frequency-hopping pattern for the UE. The base station then transmits an indication of the frequency-hopping pattern to the UE. The indication is contained in a higher layer message or in the physical layer control signaling.

The above-illustrated resource allocation method allocates resources for data and control signaling with a compact DCI. The RA design is mainly applicable for LC-MTC devices with or without coverage extension, and scenarios where there are a massive number of connected MTC devices within one serving cell. In addition, the RA design method can be also applicable for non LC-MTC UEs, especially these UEs working in coverage extension mode. Furthermore, frequency hopping is supported to improve performance by exploring diversity gain in coverage extension mode.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates resource allocation overhead for a first embodiment.

FIG. 11 illustrates resource allocation overhead for a third embodiment.

FIG. 14 illustrates resource allocation overhead for a fourth embodiment.

DETAILED DESCRIPTION

Reference will now be made in detail to some embodiments of the invention, examples of which are illustrated in the accompanying drawings.

Machine type communication is a form of data communication that involves one or more entities that do not necessarily need human interaction. A service optimized for machine type communication differs from a service optimized for human-to-human (H2H) communication. Typically, MTC services are different to current mobile network communication services because MTC services involve different market scenarios, pure data communication, lower cost and effort, and a potentially very large number of communicating terminals with little traffic per terminal. Therefore, it is important to distinguish low cost (LC) MTC from regular UEs. Legacy resource allocation (RA) and RA indication will introduce large resource overhead. Spectrum efficiency will be quite low, especially under repeated transmission in coverage extension mode. For regular UEs in coverage extension mode, enhanced RA is applied. Furthermore, currently there is no resource hopping at different subframes for the same packet transmission. Resource hopping (i.e., frequency hopping) mechanisms at frequency domain can be applied to improve performance by exploring diversity gain while keeping sufficient scheduling flexibility. Retuning time will be needed to support frequency hopping for LC-MTC UEs with single RF. Apparatus and methods are provided and described in details to support RA design to reduce RA overhead, to improve performance while keep scheduling flexibility for LC-MTC UEs and for normal UEs as well.

Figure 1:
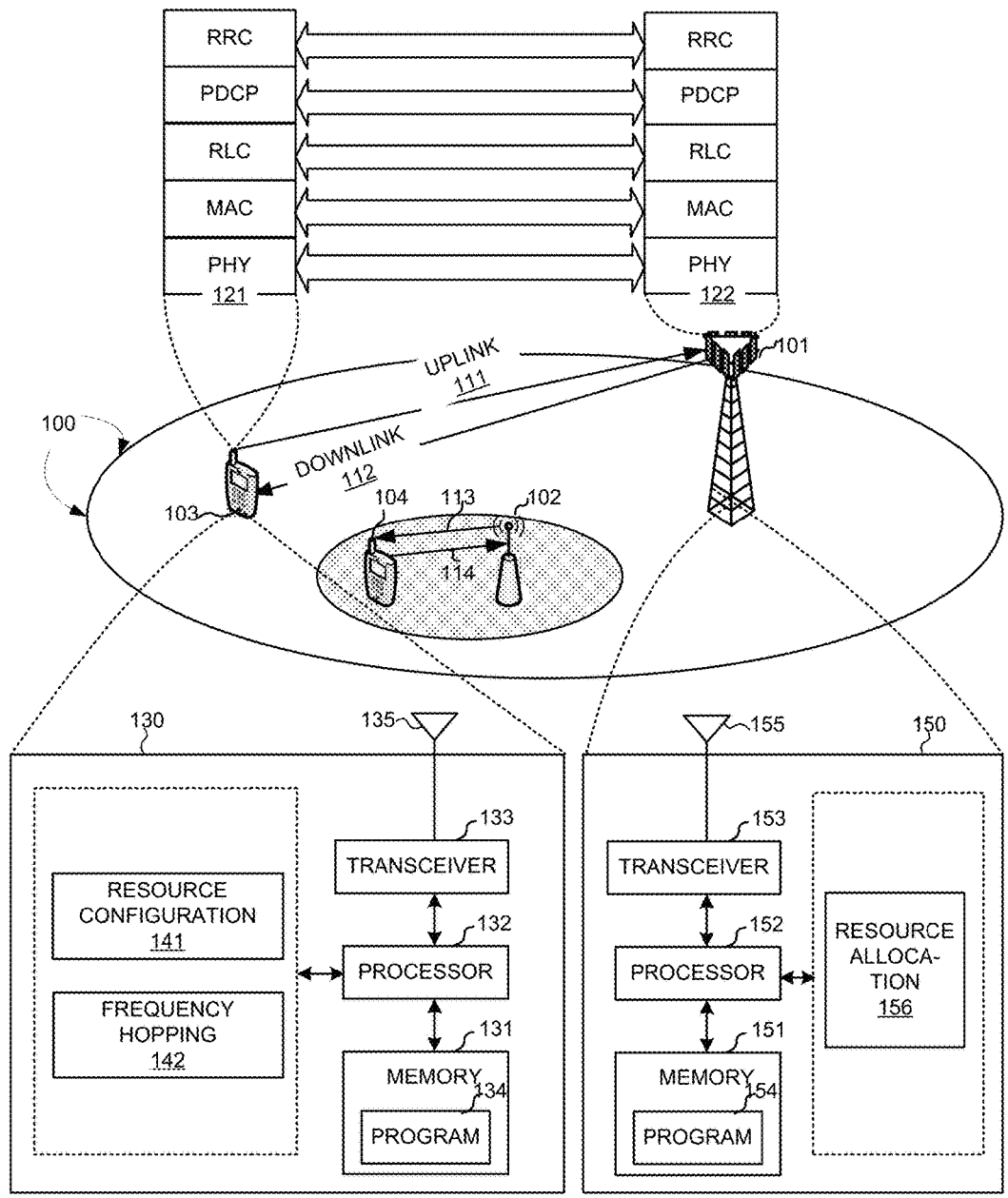
FIG. 1 illustrates a cellular mobile communication network with resource allocation for LC-MTC UE in accordance with one novel aspect.

FIG. 1 illustrates a mobile communication network 100 with LC-MTC UEs in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), or by other terminology used in the art. In FIG. 1, the one or more base stations 101 and 102 serve a number of LC-MTC UEs 103 and 104 within a serving area, for example, a cell or a cell sector. In one embodiment, LC-MTC UEs 103 and/or 104 are real LC-MTC UEs actually. In another embodiment, LC-MTC UEs 103 and/or 104 are regular UEs that are served/regarded as LC-MTC UEs. An LC-MTC UE can be originated from a regular UE, an LC-MTC UE or any other type of UE. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink (DL) communication signals 112 and 113 to MTC UEs in the time and/or frequency domain. LC-MTC UEs 103 and 104 communicate with one or more base stations 101 and 102 via uplink (UL) communication signals 111 and 114. UE or the mobile station may also be referred to as a mobile phone, laptop, and mobile workstation and so on. In FIG. 1, the mobile communication network 100 is an OFDM/OFDMA system comprising a base station eNB 101 eNB 102 and a plurality of LC-MTC UE 103 and LC-MTC UE 104. When there is a downlink packet to be sent from the eNB to the LC-MTC UE, each LC-MTC UE gets a downlink assignment, e.g., a set of radio resources for a physical downlink shared channel (PDSCH). When a LC-MTC UE needs to send a packet to eNB in the uplink, the LC-MTC UE gets an uplinkgrant from the eNB that assigns a set of uplink radio resources for a physical downlink uplink shared channel (PUSCH). The LC-MTC UE gets the downlink or uplink scheduling information from a physical downlink control channel for MTC UEs, wherein the control channel is named as M-PDCCH for easy description. Functionality of M-PDCCH, which is similar to legacy physical downlink control channel (PDCCH) or enhanced physical downlink control channel (EPDCCH), is to transmit downlink or uplink scheduling information to LC-MTC UEs. The transmitted downlink/uplink scheduling information and the other common control information via a physical control channel is referred to as downlink control information (DCI). Further, the scheduling information and other common control information via M-PDCCH, PDCCH or EPDCCH can be named as a physical layer (PHY) control signaling.

FIG. 1 also shows an exemplary diagram of protocol stacks for control-plane for LC-MTC UE 103 and eNB 101. MTC UE 103 has a protocol stack 121, which includes the physical (PHY) layer, the medium access control (MAC) layer, the radio link control (RLC) layer, the packet data convergence protocol (PDCP) layer, and the radio resource control (RRC) layer. Similarly, eNB 101 has a protocol stack 122, which includes the PHY layer, the MAC layer, the RLC layer, the PDCP layer, and the RRC layer, each of which connects with their corresponding protocol stack of UE protocol stack 121.

FIG. 1 further illustrates simplified block diagrams 130 and 150 for LC-MTC UE 103 and eNB 101, respectively. LC-MTC UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in MTC UE 103. Memory 131 stores program instructions and data 134 to control the operations of MTC UE 103. MTC UE 103 also includes multiple function modules that carry out different tasks in accordance with embodiments of the current invention. A resource configuration module 141 acquires resource allocation information, either from predefined rules, from higher layer messaging, from physical layer signaling, or any combination thereof, and determines the allocated resources for downlink reception and uplink transmission. A frequency-hopping module 142 receives frequency-hopping information from the base station and determines frequency hopping at different subframes for coverage extension.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes function modules that carry out different tasks in accordance with embodiments of the current invention. A resource allocation module 156 performs RA functions to support the LC-MTC UE with reduced RA overhead and improved system performance.

Figure 2:
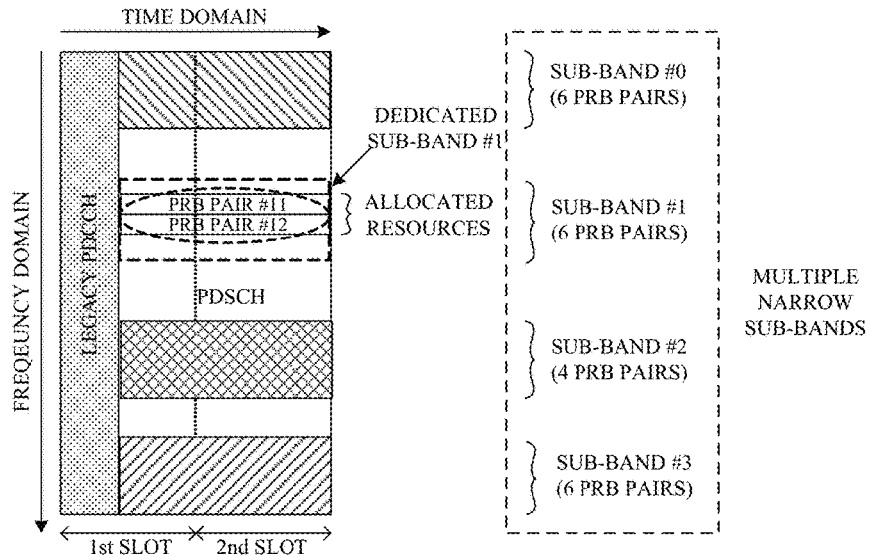
FIG. 2 illustrates resource allocation design for LC-MTC UE in accordance with one novel aspect.

FIG. 2 illustrates resource allocation design for LC-MTC UEs in accordance with one novel aspect. Due to reduced bandwidth design for cost reduction, resources for LC-MTC UEs are limited to contiguous six physical resource block (PRB) pairs (1.4 MHz). For easy description, a set of resources comprising six or less contiguous PRBs for LC-MTC transmission/reception is named as MTC narrow sub-band, which is located in the whole channel bandwidth, for example, in FIG. 2 for subband #2, there are 4 PRB pairs. In the following description, N_BW denotes the whole channel bandwidth while N_sub_BW denotes the bandwidth of an MTC narrow sub-band, N_sub denotes the numbers of narrow sub-bands. To reduce overall resource allocation overhead, multiple narrow sub-bands are first signaled by a higher layer message or indexed based on a predefined rule (e.g., from sub-band #0 to sub-band #3). One or more dedicated narrow sub-bands for transmission are then indicated by physical control signaling (e.g., sub-band #1), and allocated resources within each of these dedicated narrow sub-bands (e.g., PRB pair #11 and PRB pair #12) are indicated by the physical control signaling as well. Furthermore, the dedicated MTC narrow sub-bands are determined without or with frequency hopping to explore diversity gain in coverage extension mode. The UE then uses the allocated resources for uplink or downlink transmission.

In one option, the multiple narrow sub-bands are signaled by a higher layer message, and some or all sub-bands from the multiple narrow sub-bands are signaled to UE via M-PDCCH for transmission. This option has scheduling flexibility at eNB side, and provides inter/intra-cell interference coordination (ICIC) especially for uplink transmission. In another option, the multiple narrow sub-bands are obtained by a predefined rule, and some or all the sub-bands from the multiple narrow sub-bands are signaled to UE via M-PDCCH for transmission. This option is simpler and requires less resource overhead at the cost of scheduling limitation.

In one exemplary embodiment, one message indicates both downlink sub-band for data or control signaling transmission and uplink sub-band for data or control signaling transmission at the same time, since DL sub-band and UL sub-band is bundled, considering RF retuning restriction and signaling overhead. For example, there is certain relationship, based on the distance of central frequency for DL sub-band and UL sub-band, between DL sub-band and UL sub-band. The relationship can be one-to-one mapping or one-to-more mapping. In one example, there can be a table of sub-band information wherein each couple of DL sub-band and UL sub-band is indexed, and the index can be signaled to UE to determine MTC narrow sub-bands for DL and UL transmission. In another exemplary embodiment, DL sub-band and UL sub-band are configured separately, considering scheduling flexibility.

Among the multiple MTC narrow sub-bands, Frequency Division Multiplexing (FDM) is preferred, i.e., no overlap between the multiple MTC narrow sub-bands. This is because overlap between the multiple MTC narrow sub-bands would introduce complexity and signaling overhead. However, there may be overlap if considering channel raster. Within one MTC narrow sub-band, resource multiplexing in frequency domain is allowed. Multiple UEs (LC-MTC UEs and regualr UEs) can be scheduled within one sub-band. In normal coverage, spatial multiplexing is allowed between multiple UEs within one narrow sub-band. In case of coverage extension, spatial multiplexing between multiple UEs is not preferred. The whole resources within one sub-band can be allocated for only one UE to reduce power consumption at UE side due to less transmission delay.

Within one MTC narrow sub-band, contiguous resource allocation is preferred. A plurality of contiguous PRBs within each sub-band are allocated, because diversity gain by resource hopping or distribution within one sub-band is limited anyway. Further, signaling overhead by a contiguous allocation method can be smaller than that to support resource distribution within one narrow sub-band. For detailed resource allocation within one sub-band, the logical starting index and the resource size/length are given. In one exemplary embodiment, the RA overhead size can be represented as cell (log 2(N_sub_BW*(N_sub_BW+1)/2)) bits.

In accordance with one novel aspect, allocated resources for transmission hop at frequency domain (i.e., frequency hopping) to explore diversity gain, especially under a repeated transmission mechanism to compensate penetration loss. Transmission duration, resources, and power consumption at UE side can be improved because of better performance by frequency hopping. In case of frequency hopping, eNB should ensure that there is no collision between the allocated narrow sub-bands. It is preferred that the logical location of allocated resources within each narrow sub-band keeps unchanged in case of hopping. The hopping pattern can be cell-specific or UE-specific. Cell-specific hopping can be applied to coordinate inter/intra-cell interference and narrow sub-band collision. A broadcast higher layer message is used for a cell-specific frequency hopping. UE-specific higher layer message or PHY control signaling is given for UE-specific frequency hopping. The frequency hopping can be a predefined hopping by a predefined rule in one option, a semi-static hopping by a higher layer message in a second option, or a dynamic hopping by a PHY control signaling in a third option.

Figure 3:
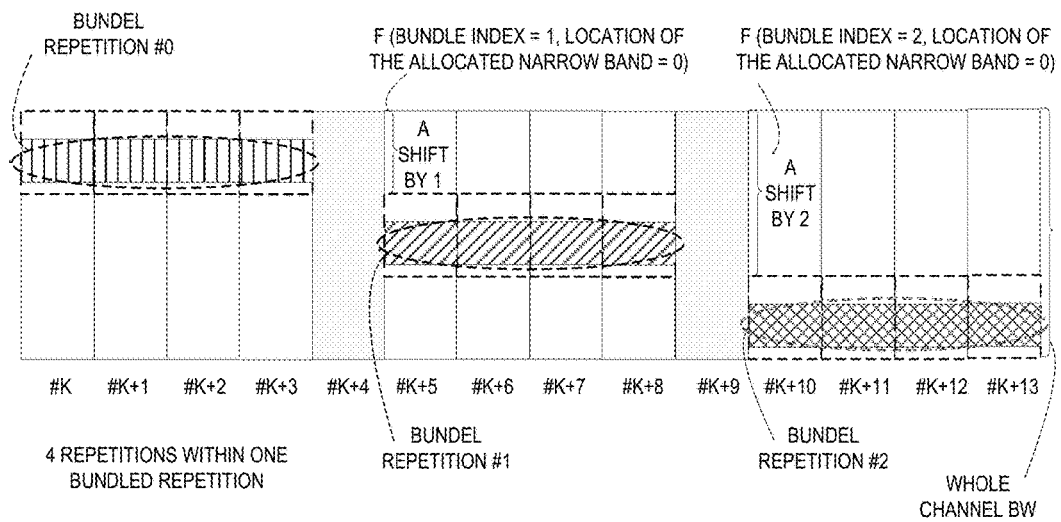
FIG. 3 illustrates frequency hopping in resource allocation design.

FIG. 3 illustrates an example of frequency hopping of allocated resources in frequency domain in case of a repeated transmission, by a predefined hopping pattern. In the example of FIG. 3, a same set of resources are used during one bundled repetition, wherein there are four repetitions within one bundled repetition, and resources hop among different bundled repetitions. During bundled repetition #0, a UE transmits using a first narrow sub-band repeatedly within four subframes from subframe #k to subframe #k+3. During bundled repetition #1, the UE transmits using a second narrow sub-band repeatedly in four subframes from subframe #k+5 to subframe #k+8. During bundle repetition #2, the UE transmits using a third narrow sub-band repeatedly in four subframes from subframe #k+10 to subframe #k+13. In this example, the location of second narrow sub-band at frequency domain is obtained by adding a shift value 1 to the location of first narrow sub-band, and the third narrow sub-band is obtained by adding a same shift value to the second narrow sub-band, or adding a shift value 2 to the first narrow sub-band. In a word, the physical location of a dedicated narrow sub-band for transmission is a function of the bundle index and the location of the location of the allocated narrow sub-band for initial transmission, under a predefined hopping pattern. Note that the duration of a bundled repetition can be 1 subframe or multiple subframe by configuration.

In the design option of predefined hopping, a set of allocated resources hop according to a predefined rule, which is a function of subframe index/repetition index/physical location of allocated resources/physical location of narrow sub-band where allocated resources locate, etc. Such mechanism can be applied without any additional signaling about available narrow bands at the cost of scheduling limitation. However, the predefined hopping itself can be enabled by an indicator within PHY signaling or configured by higher layer configuration.

In semi-static hopping, multiple sets of resources within multiple dedicated narrow sub-bands are allocated for transmission, and hop among these multiple dedicated narrow sub-bands by a higher layer configuration, where each set of resources is located in one corresponding dedicated narrow sub-band. If only one dedicated narrow sub-band is configured, then there is no sub-band frequency hopping in frequency domain. If the logical index of resources within a narrow sub-band is enabled to change, then the shift value for the logical index within a narrow sub-band can be given by another higher layer configuration, or control signaling, or by a predefined function. Such semi-static hopping provides some flexibility in resource scheduling at the cost of additional signaling to configure the multiples sets of resources.

In dynamic hopping, resources for transmission hop among multiple dedicated narrow sub-bands, which are configured by PHY control signaling. If only one narrow sub-band is configured, then there is no sub-band frequency hopping in frequency domain. If the logical index of resources within a narrow sub-band is enabled to change, then the shift value for the logical index within a narrow sub-band can be given by PHY layer signaling or by a predefined function. Such dynamic hopping provides more flexibility in resource scheduling at the cost of additional signaling to configure the multiples sets of resources dynamically.

Figure 4:
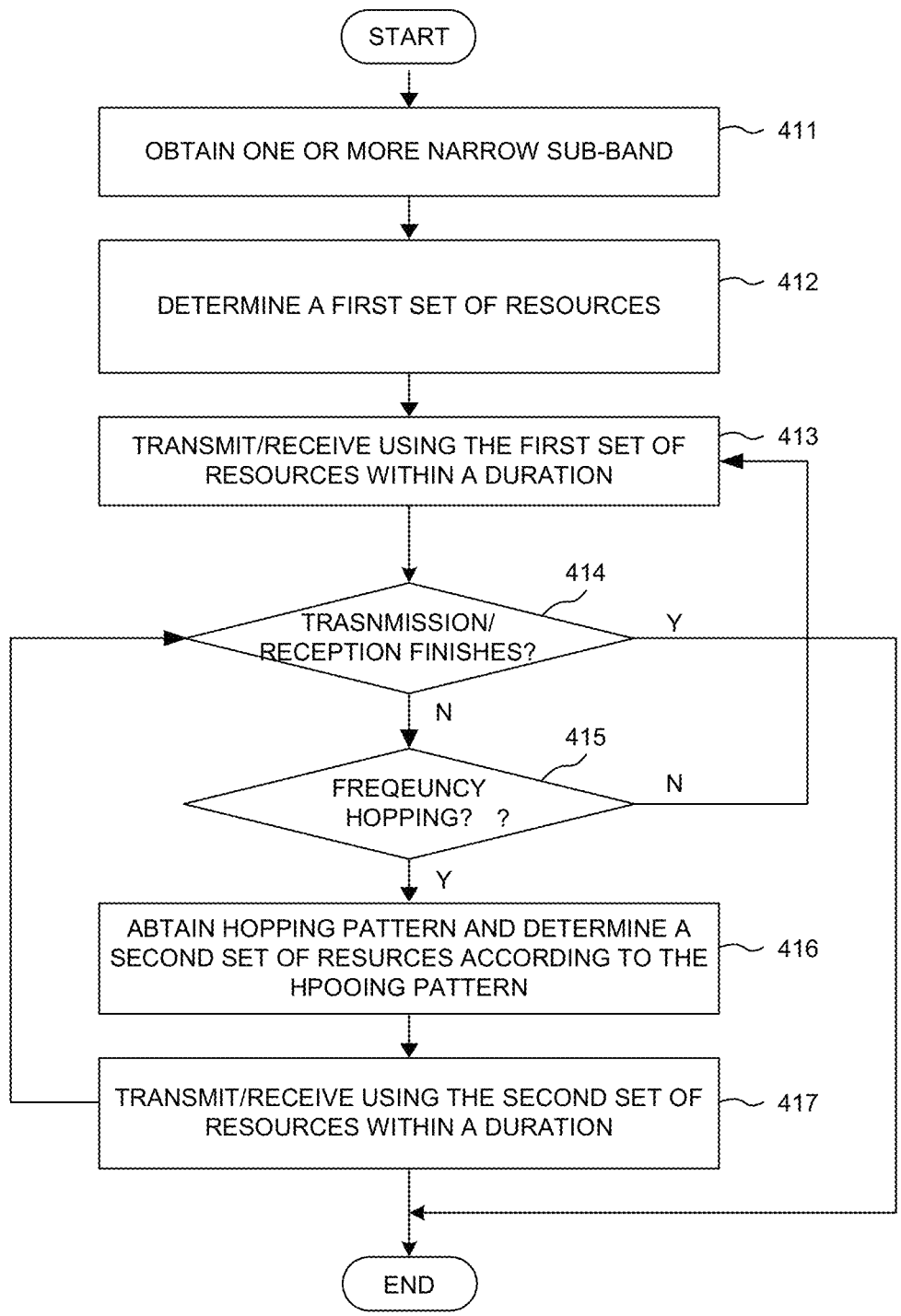
FIG. 4 is a flow chart of resource allocation design and transmission reception procedure.

FIG. 4 is a flow chart of transmission/reception procedure of a LC-MTC UE in coverage extension mode under the resource allocation design. In step 411, the UE obtains one or multiple narrow sub-bands from a higher layer message or according to predefined rules. In step 412, the UE determines a first set of resources within a first narrow sub-band of the obtained one or muptiple narrow sub-bands according to a PHY control signaling, combined with the higher layer message or with the predefined rules. In step 413, the UE transmits or receives radio signals using the first set of resources within a duration. In step 414, the UE determines whether the transmission/reception is completed or not. If NO in step 414, then the UE further determines whether frequency hopping is applied for coverage extension mode in step 415. If NO in step 415, then the UE goes back to step 413 and performs transmission/reception using the first set of resources within a duration. If YES in step 415, then the UE goes to step 416 to obtain a hopping pattern and determines a second set of resources within a second narrow sub-band of the obtained one or multiple narrow sub-bands according to the hopping pattern from higher layer message or from PHY control signaling or by a predefined rule. In step 417, the UE then transmits or receives radio signals using the second set of resources within a duration. The UE goes back step 414 and repeats the procedure until the data transmission/reception is completed. Various embodiments of RA design comprising narrow sub-band allocation and resource allocation within a narrow sub-band are now described below with accompany drawings.

In a first embodiment of resource allocation, one or multiple sets of resources are allocated by a broadcast higher layer message and PHY control signaling. The PHY control signaling can be UE-specific to schedule UE-specific data transmission, or common to schedule common message transmission. In the first embodiment, a set of MTC narrow sub-bands are broadcasted by a higher layer message. These narrow sub-bands are cell-specific. The signaled sub-bands depend on eNB scheduling (UEs have no idea of signaled sub-bands before receiving the message) in one embodiment, or are selected from a set of sub-bands determined by a predefined rule (UEs know how many sub-bands within this cell) in another embodiment. One or more MTC narrow sub-bands from the configured set of narrow sub-bands are then indicated by an indicator within a PHY control signaling. If multiple narrow sub-bands are indicated, then frequency hopping is performed within these allocated narrow sub-bands. Following this resource allocation design, resource size and a logical resource start index within a narrow sub-band are given in the PHY control signaling to determine the exact allocated resources within each sub-band. The allocated resources within each sub-band are then used for transmission within a time window, wherein the time window duration can be specified, or indicated by a higher layer message or PHY control signaling. In a preferred embodiment, each sub-band is with 6PRBs to reduce signaling resource overhead.

FIG. 5 illustrates resource allocation overhead for the first embodiment. The RA overhead comprises two parts, one part is RA overhead of broadcast signaling of narrow sub-band, and the other part is RA overhead of PHY control signaling for exact resource allocation. The RA overhead of broadcast signaling comprises a starting PRB index for each sub-band. If a bandwidth of each narrow sub-band is identical and fixed/predefined (e.g., 6 PRBs), there is no additional signaling for sub-band bandwidth. If a bandwidth of each narrow sub-band is different from each other and can vary with time, additional signaling will be needed to indicate a bandwidth for a narrow sub-band. In this example, the starting PRB index for each narrow sub-band requires Ceil (log 2(N_BW)) bits and the bandwidth requires 0 bits if the bandwidth is fixed as 6PRBs or 3 bits if the bandwidth is less than 6PRBs. The RA overhead of PHY control signaling comprises a narrow sub-band index, a resource size, a logical resource start index, and an intra-sub-band shift value if enabled. The narrow sub-band index requires Ceil (log 2(N_sub)) bits, where N_sub is up to eNB configuration and based on network load. If multiple sub-bands are allocated, then the resource overhead is a sum of Ceil (log 2(N_sub)), which can be expressed as $$m \times \lceil \log 2(N\_sub) \rceil, 1 \leq m \leq N\_sub$$

The resource size requires 3 bits since resources for LC-MTC UEs are limited to six PRBs, the logical resource start index requires 3 bits, and the intra-sub-band shift value requires 3 bits.

Figure 6:
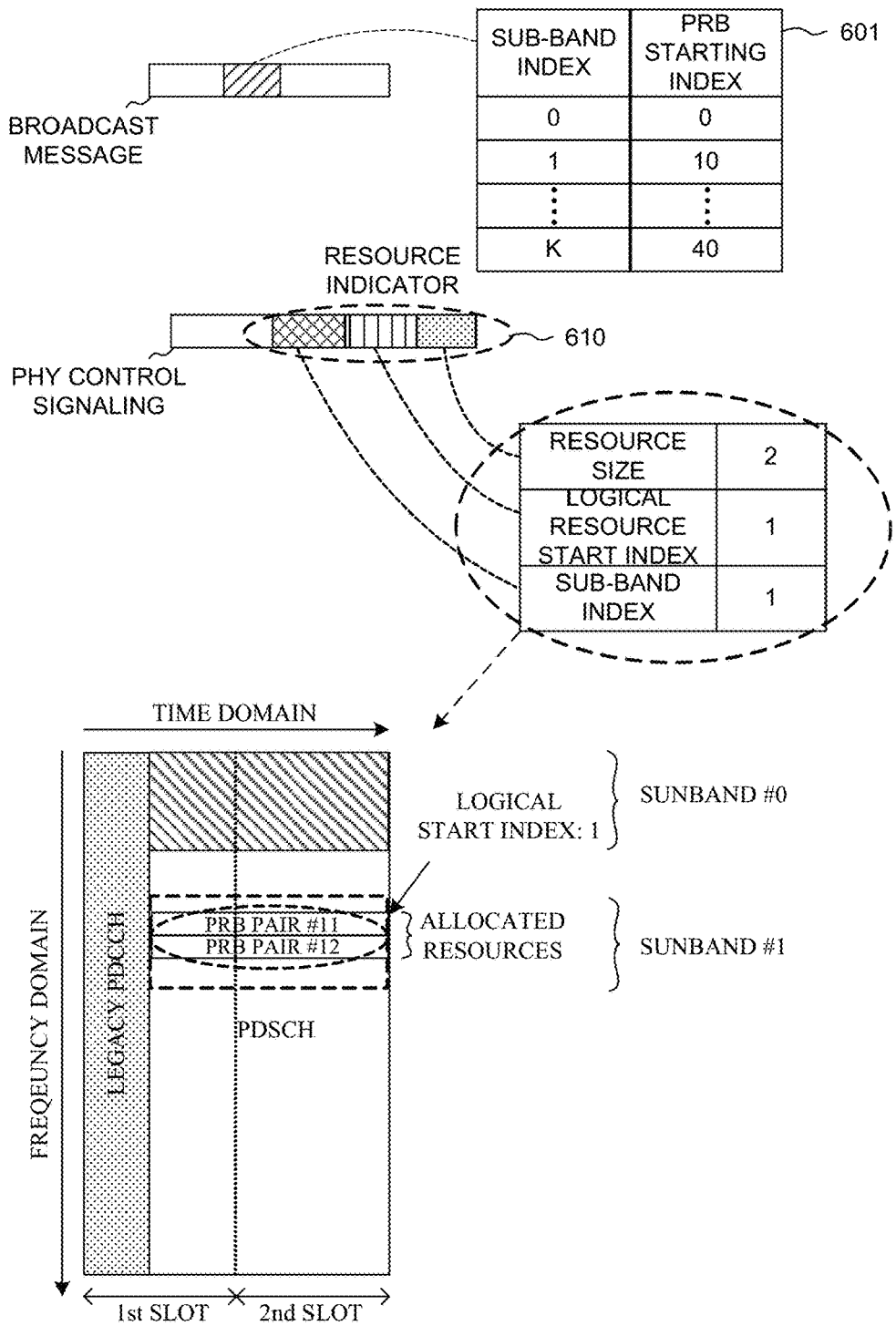
FIG. 6 illustrates one example of resource allocation design without frequency hopping for the first embodiment.

FIG. 6 illustrates one example of resource allocation design without frequency hopping for the first embodiment. In the example of FIG. 6, a base station broadcasts a plurality of MTC narrow sub-bands with the sub-band index and the starting PRB index for each sub-band. As depicted by table 601, the broadcast message signals sub-bands #0, #1 . . . to #k, each sub-band having a PRB starting index of 0, 10 . . . to 40, respectively. The base station then transmits a PHY control signaling comprising a resource indicator 610. The resource indicator 610 contains information of the resource size (2 PRB pairs), the logical resource start index (1), and the sub-band index (sub-band #1). Upon receiving both the broadcast message and the resource indicator, the UE is then able to determine that PRB pair #11 and PRB pair #12 from the indicated sub-band #1 are the allocated resources. Because only one sub-band (e.g., sub-band #1) is indicated and no indication to enable frequency hopping, there is no frequency hopping in frequency domain.

Figure 7:
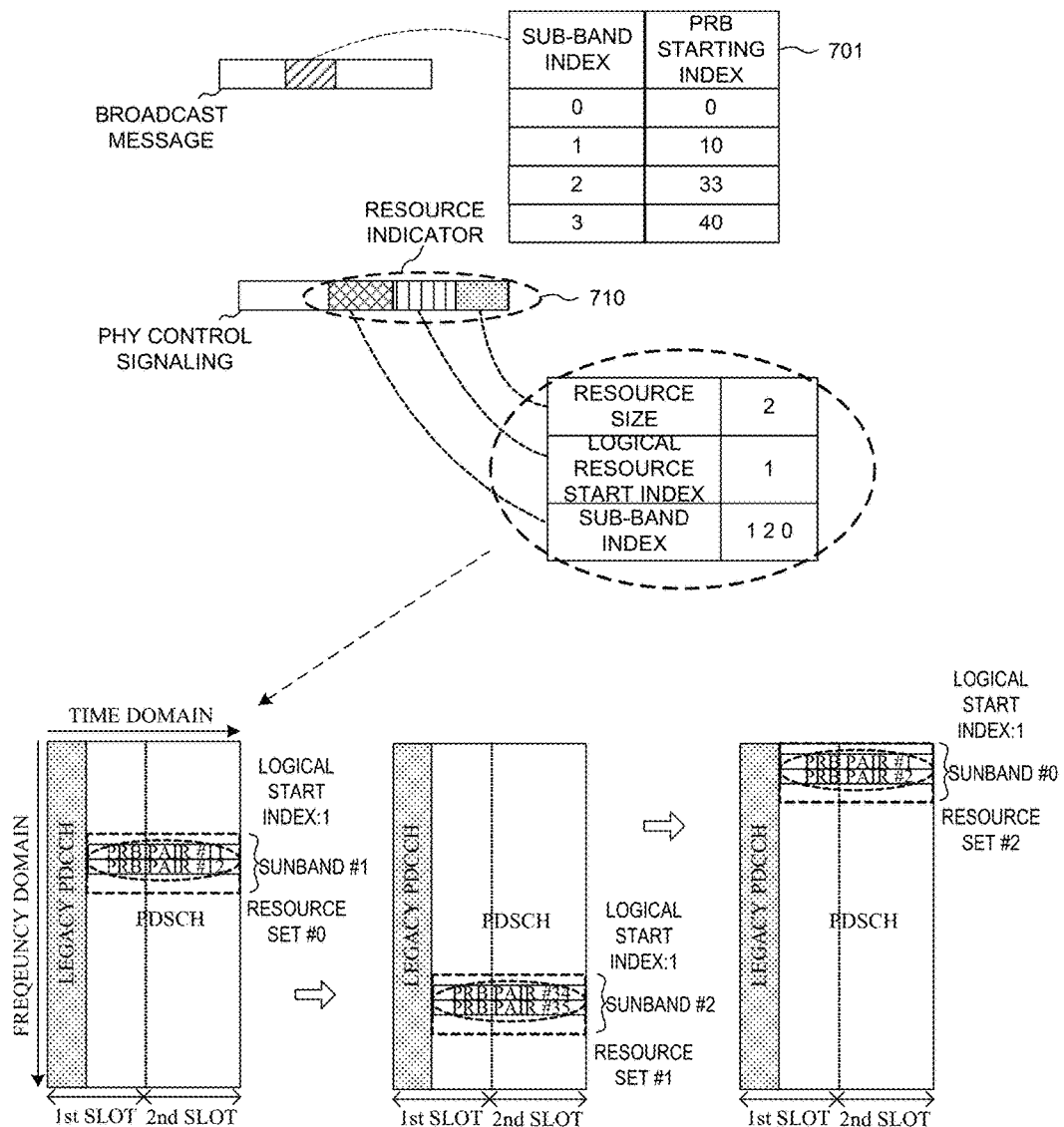
FIG. 7 illustrates one example of resource allocation design with frequency hopping for the first embodiment.

FIG. 7 illustrates one example of resource allocation design with frequency hopping for the first embodiment. In the example of FIG. 7, a base station broadcasts a plurality of MTC narrow sub-bands with the sub-band index and the starting PRB index for each sub-band. As depicted by table 701, the broadcast message signals sub-bands #0, #1, #2, and #3, each sub-band having a PRB starting index of 0, 10, 33, and 40, respectively. The base station then transmits a PHY control signaling comprising a resource indicator 710. The resource indicator 710 contains information of the resource size (2 PRB pairs), the logical resource start index (1), and the sub-band index (sub-bands #1, #2, and #0). Upon receiving both the broadcast message and the resource indicator, the UE is then able to determine that PRB pair #11 and PRB pair #12 from the first indicated sub-band #1 are the first set of allocated resources (resource set #0). The UE then uses resource set #0 for transmission/reception within a duration. Because multiple sub-bands are indicated by resource indicator 710, the UE determines PRB pair #34 and PRB pair #35 from the next indicated sub-band #2 as the second set of allocated resources (resource set #1). Finally, the UE determines PRB pair #1 and PRB pair #2 from the last indicated sub-band #0 as the third set of allocated resources (resource set #2).

Figure 8:
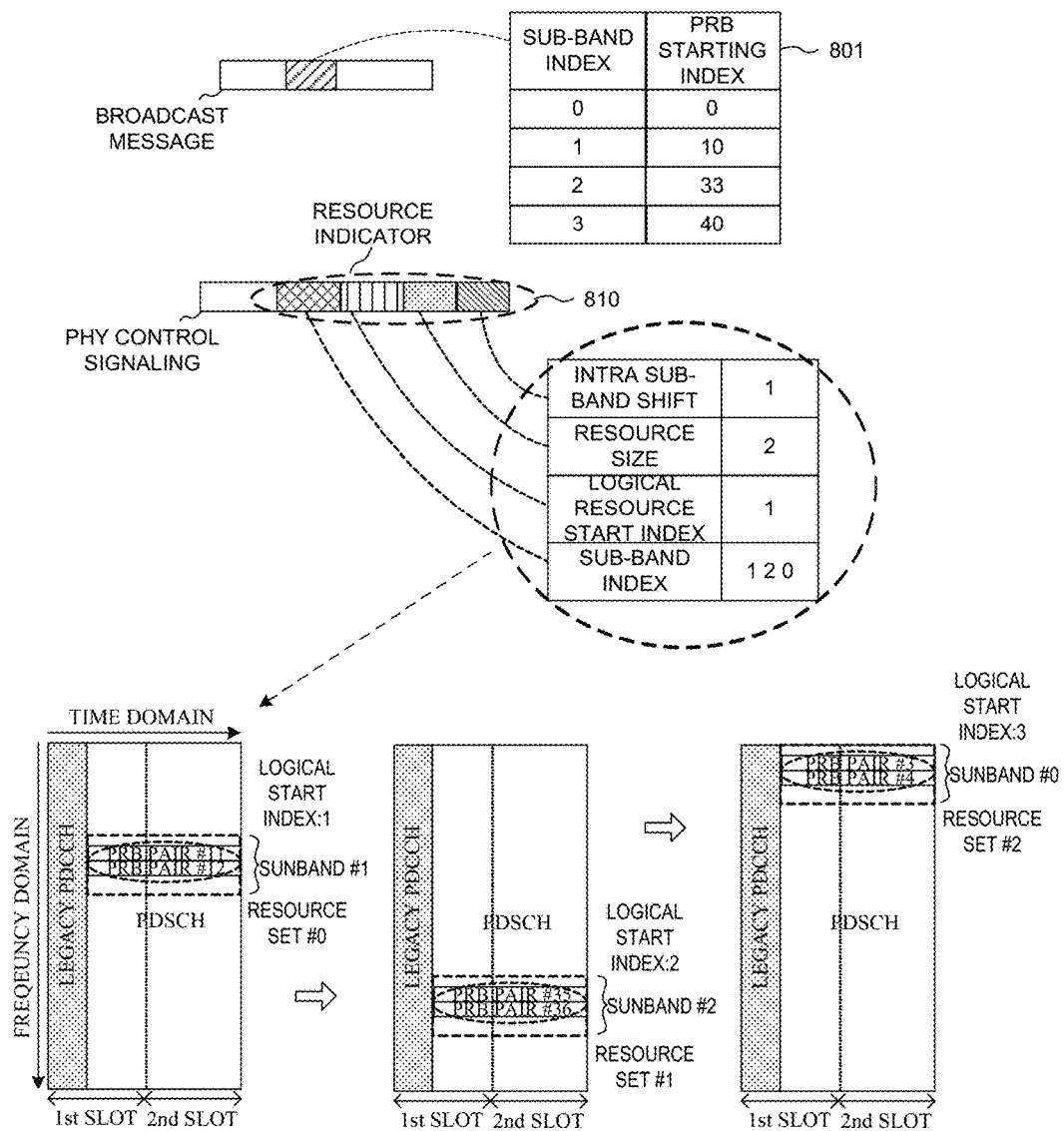
FIG. 8 illustrates another example of resource allocation design with frequency hopping for the first embodiment.

FIG. 8 illustrates another example of resource allocation design with frequency hopping for the first embodiment. The example of FIG. 8 is similar to the example of FIG. 7. However, the resource indicator 810 comprises an additional field of intra sub-band shift value of 1, meaning that the logical resource start index will be shifted by 1 PRB within a narrow sub-band for frequency hopping. As a result, the UE first determines that PRB pair #11 and PRB pair #12 (start index=1) from the first indicated sub-band #1 are the first set of allocated resources (resource set #0). The UE then determines PRB pair #35 and PRB pair #36 (start index=2 by adding a shift 1 to the indicated logical resource starting index for resource set #0) from the next indicated sub-band #2 as the second set of allocated resources (resource set #1). Finally, the UE determines PRB pair #3 and PRB pair #4 (start index=3 by adding a shift 1 to the logical resource starting index for resource set #1) from the last indicated sub-band #0 as the third set of allocated resources (resource set #2).

In a second embodiment of resource allocation, one or multiple sets of resources are allocated by UE-specific higher layer configuration and UE-specific PHY control signaling. In the second embodiment, a set of MTC narrow sub-bands are configured by a UE-specific higher layer message. These narrow sub-bands are UE-specific. The signaled sub-bands depend on eNB scheduling (UEs have no idea of signaled sub-bands before receiving the message), or are selected from a set of sub-bands determined by a predefined rule (UEs know how many sub-bands within this cell). One or more MTC narrow sub-bands from the configured set of narrow sub-bands are then indicated by an indicator within PHY control signaling. If multiple narrow sub-bands are indicated, then frequency hopping is performed within these indicated narrow sub-bands. The allocated resources within each sub-band are then used for transmission within a time window. In a preferred embodiment, each sub-band is with 6PRBs to reduce signaling resource overhead.

In the second embodiment, the RA overhead comprises two parts, one part is RA overhead of UE-specific higher layer configuration, and the other part is RA overhead of UE-specific PHY control signaling. In a first option, the RA overhead of UE-specific higher layer configuration comprises a starting PRB index for each sub-band based on eNB scheduling and a bandwidth of a narrow sub-band. The starting PRB index requires Ceil (log 2(N_BW)) bits and the bandwidth requires 0 bits if the bandwidth is fixed as 6PRBs or 3 bits if the bandwidth is less than 6PRBs. In a second option, the RA overhead of UE-specific higher layer configuration comprises a sub-band index indication if MTC narrow sub-bands are obtained by dividing whole channel bandwidth, which can be expressed as $$m \times \lceil \log 2(N\_sub) \rceil, 1 \leq m \leq N\_sub$$

In the second embodiment, the RA overhead of UE-specific PHY layer control signaling comprises a resource size, a logical resource start index, and an intra-sub-band shift value if enabled. The resource size requires 3 bits, the logical resource start index requires 3 bits, and the intra-sub-band shift value requires 3 bits if intra-sub-band hopping is enabled.

Figure 9:
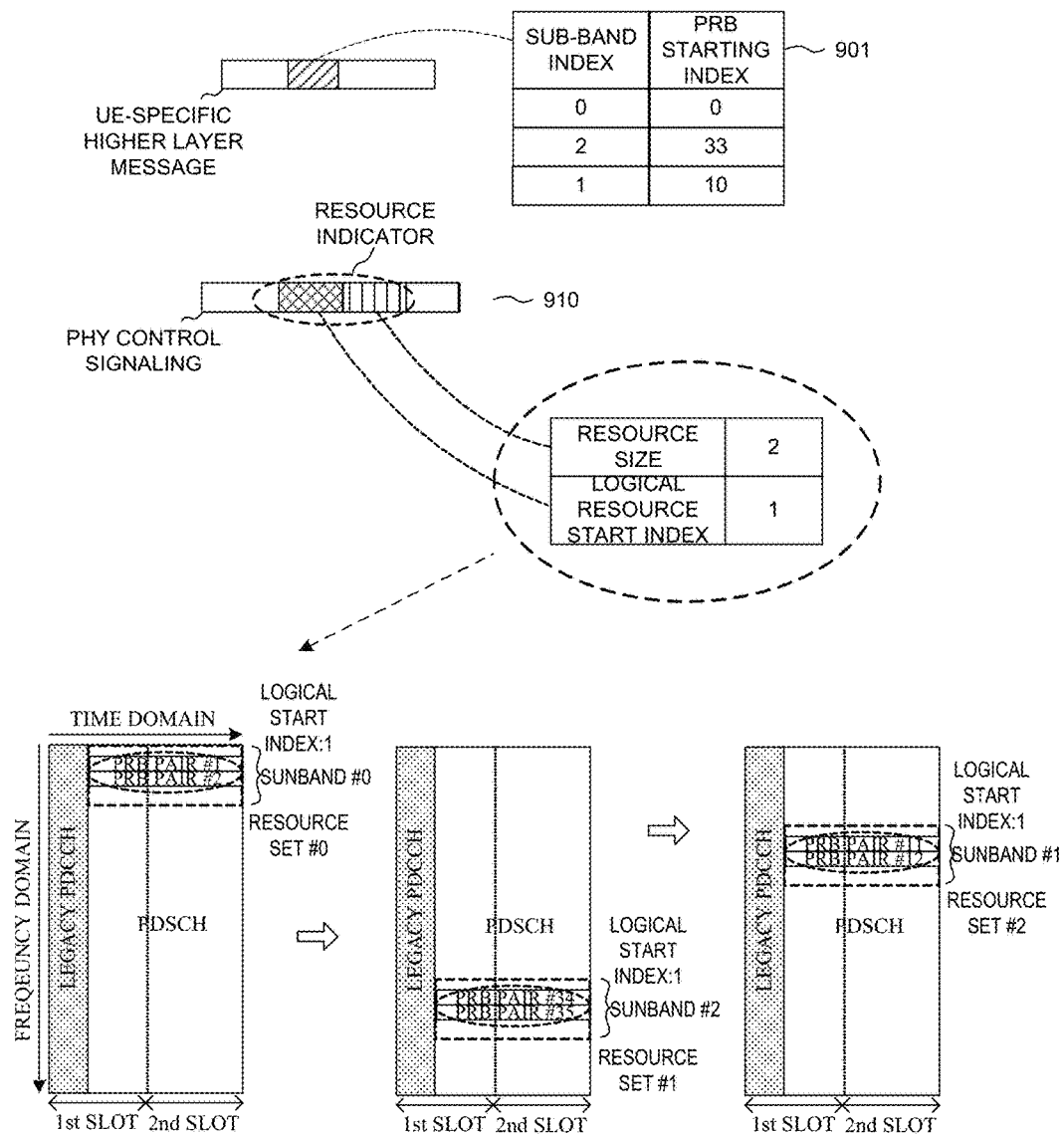
FIG. 9 illustrates one example of resource allocation design with frequency hopping for a second embodiment.

FIG. 9 illustrates one example of resource allocation design with frequency hopping for the second embodiment. In the example of FIG. 9, a base station configures a plurality of MTC narrow sub-bands with the sub-band index and the starting PRB index for each sub-band via a UE-specific higher layer message, and the frequency hopping pattern is predetermined according to the configured sub-bands, for example, from the subband #0, to subband #2, and then to subband #1. As depicted by table 901, the UE-specific higher layer message allocates sub-bands #0, #2, and #1, each sub-band having a PRB starting index of 0, 33, and 10, respectively. The base station then transmits a UE-specific control signaling comprising a resource indicator 910 for UE to determine the exact allocated resources. The resource indicator 910 contains information of the resource size (2 PBR pairs) and the logical resource start index (1). Upon receiving both the higher-layer message and the resource indicator within the PHY control signaling, the UE is then able to determine that PRB pair #1 and PRB pair #2 from the first allocated MTC narrow sub-band #0 are the first set of allocated resources (resource set #0) allocated for transmission/reception. The UE then determines PRB pair #34 and PRB pair #35 from the next allocated MTC narrow sub-band #2 as the second set of allocated resources (resource set #1). Finally, the UE determines PRB pair #11 and PRB pair #12 from the last allocated MTC narrow sub-band #1 as the third set of allocated resources (resource set #2).

Figure 10:
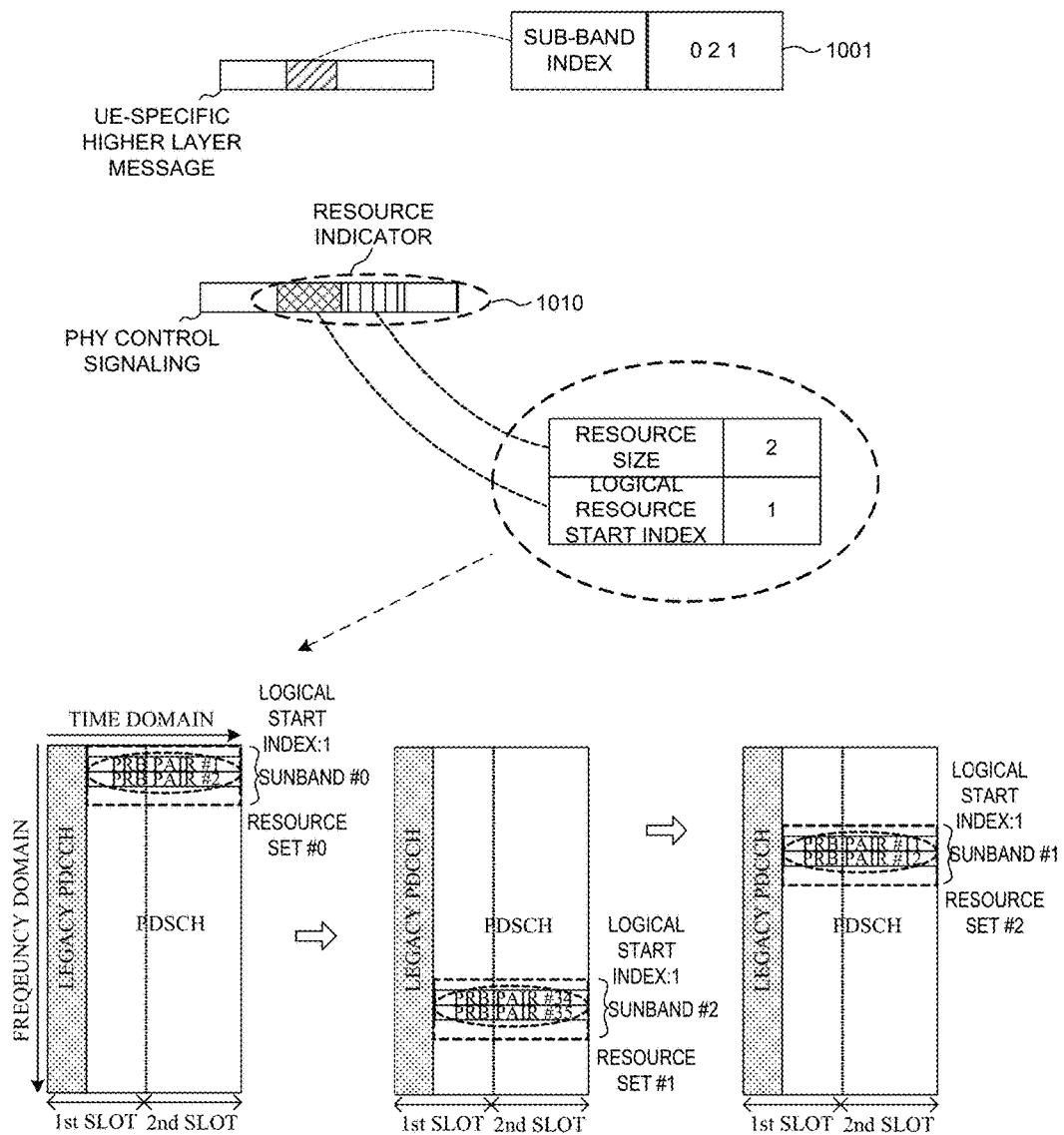
FIG. 10 illustrates another example of resource allocation design with frequency hopping for the second embodiment.

FIG. 10 illustrates another example of resource allocation design with frequency hopping for the second embodiment. The example of FIG. 10 is similar to the example of FIG. 9. In the example of FIG. 10, however, the UE-specific higher layer message comprises only a sub-band index indication because the narrow sub-bands with 6 PRBs per sub-band are obtained by dividing whole channel bandwidth. In one case, if the sub-bands are selected from a set of sub-bands determined by a predefined rule, which means that, UEs know the starting points of every narrow sub-band. As depicted by table 1001, the UE-specific higher layer message allocates sub-bands #0, #2, and #1. The base station then transmits a UE-specific PHY control signaling comprising a resource indicator 1010 for UE to determine the exact allocated resources. The resource indicator 1010 contains information of the resource size (2 PRB pairs) and the logical resource start index (1). Upon receiving both the higher-layer message and the resource indicator, the UE is then able to determine that PRB pair #1 and PRB pair #2 from the first allocated MTC narrow sub-band #0) are the first set of allocated resources (resource set #0)) for transmission/reception. The UE then determines PRB pair #4 and PRB pair #35 from the next allocated MTC narrow sub-band #2 as the second set of allocated resources (resource set #1). Finally, the UE determines PRB pair #11 and PRB pair #12 from the last allocated MTC narrow sub-band #1 as the third set of allocated resources (resource set #2).

In a third embodiment of resource allocation, one or more sets of resources are allocated by PHY control signaling and predefined rules, wherein the predefined rule specifies to obtain multiple narrow sub-bands by dividing whole channel bandwidth from one channel edge (e.g, the upper bound or the lower bound of the channel). In the third embodiment, one or more MTC narrow sub-bands are indicated by a PHY control signaling, where the configured sub-bands are from a set of narrow sub-bands obtained by dividing the whole channel bandwidth. The resource allocation overhead comes from the PHY control signaling that comprises an indicator that indicates the narrow sub-band index, which can be expresses as $m \times \lceil \log 2(N\_sub) \rceil$, $1 \leq m \leq N\_sub$ The RA overhead of the PHY control signaling also comprises a resource size, a logical resource start index, and an intra-sub-band shift value if enabled. The resource size requires 3 bits, the logical resource start index requires 3 bits, and the intra-sub-band shift value requires 3 bits. FIG. 11 illustrates resource allocation overhead for the third embodiment with one narrow sub-band for transmission and no frequency hopping.

Figure 12:
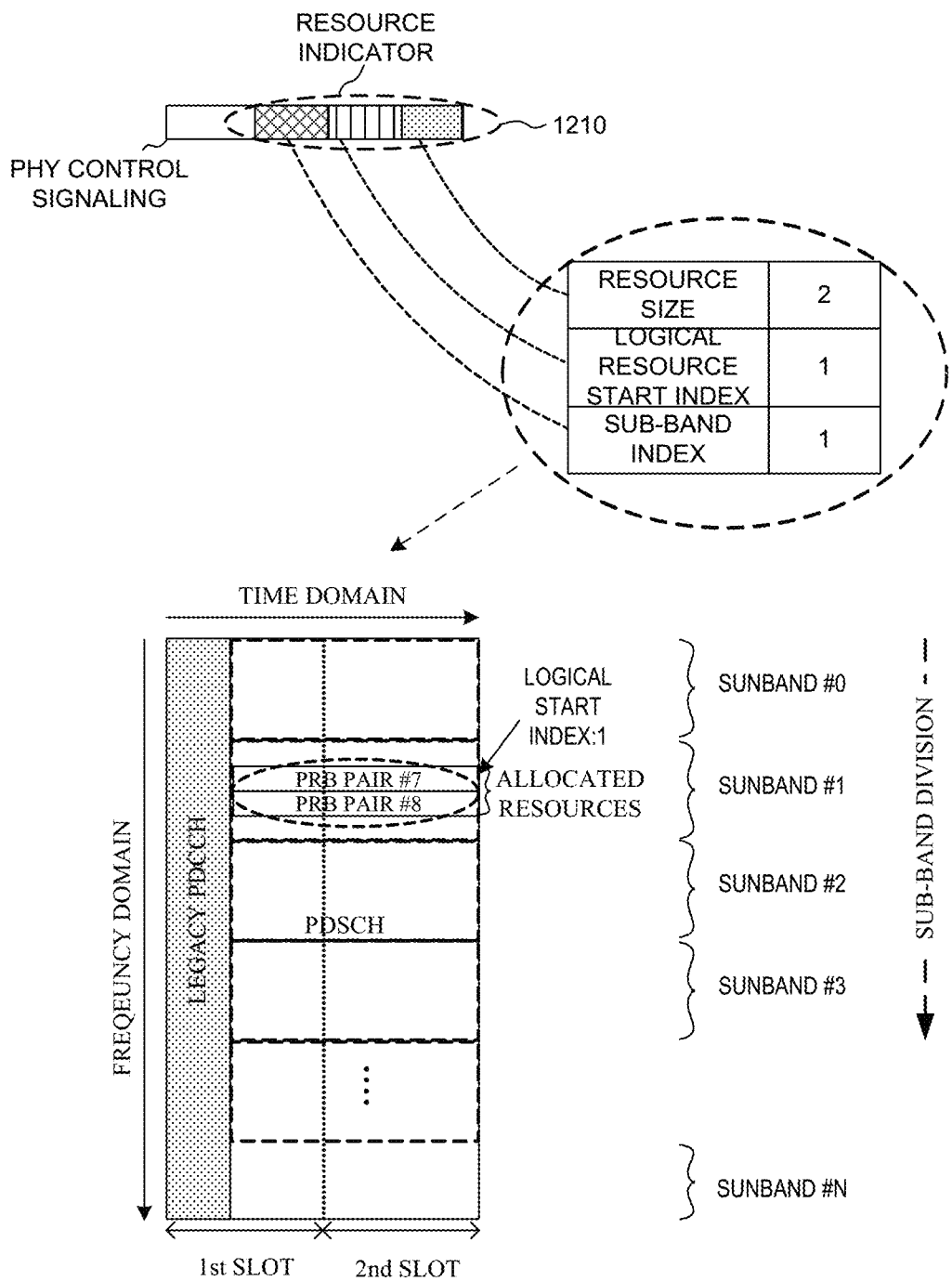
FIG. 12 illustrates one example of resource allocation design without frequency hopping for the third embodiment.

FIG. 12 illustrates one example of resource allocation design without frequency hopping for the third embodiment. In the example of FIG. 12, a set of MTC narrow sub-bands is defined by dividing the entire channel bandwidth from the upper bound of the channel bandwidth, e.g., from sub-band #0 to sub-band #N, for example each sub-band is with a fixed size, 6PRB, so in this case, for sub-band #0, the index of the PRBs are from 0 to 5, and for sub-band #1, the index of the PRBs are from 6 to 11. The base station then transmits a PHY control signaling comprising a resource indicator 1210 via M-PDCCH for LC-MTC UEs. The resource indicator 1210 contains information of the resource size (2 PRB pairs), the logical resource start index (1), and sub-band index (sub-band #1). Based on the predefined rule and the resource indicator, the UE is then able to determine PRB pair #7 and PRB pair #8 from sub-band #1 as the allocated resources for transmission. Because only one sub-band is indicated and no indication for frequency hopping by a predefined rule, there is no frequency hopping in frequency domain.

Figure 13:
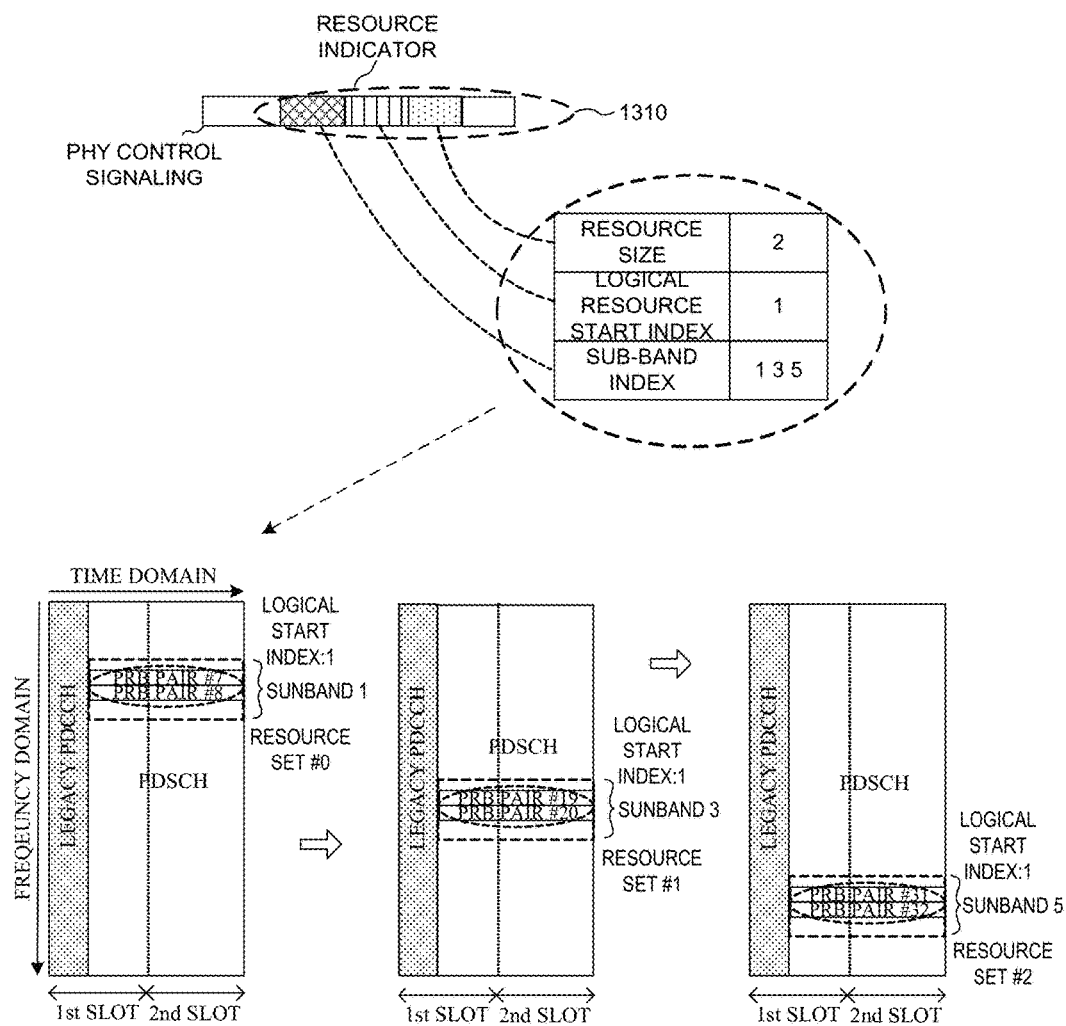
FIG. 13 illustrates one example of resource allocation design with frequency hopping for the third embodiment.

FIG. 13 illustrates one example of resource allocation design with frequency hopping for the third embodiment. In the example of FIG. 13, a set of MTC narrow sub-bands is defined by dividing the entire channel bandwidth from the upper bound of the channel bandwidth, e.g., from sub-band #0 to sub-band #N, for example each sub-band is with a fixed size, 6PRB, in this case, for sub-band #1, the index of the PRBs are from 6 to 11, and for sub-band #3, the index of the PRBs are from 18 to 23, and for sub-band #5, the index of the PRBs are from 30 to 35. The base station then transmits a PHY control signaling comprising a resource indicator 1310 via M-PDCCH. The resource indicator 1310 contains information of the resource size (2 PRB pairs), the logical resource start index (1), and sub-band index (sub-band #1, #3, and #5). Based on the predefined rule and the resource indicator, the UE is then able to determine that PRB pair #7 and PRB pair #8 from the first allocated MTC narrow sub-band #1 are the first set of allocated resources (resource set #0) for transmission/reception. The UE then determines PRB pair #19 and PRB pair #20 from the next allocated MTC narrow sub-band #3 as the second set of allocated resources (resource set #1). Finally, the UE determines PRB pair #31 and PRB pair #32 from the last allocated MTC narrow sub-band #5 as the third set of allocated resources (resource set #2).

In a fourth embodiment of resource allocation, one or more sets of resources are allocated by PHY control signaling and predefined rules, wherein the predefined rule specifies to obtain multiple narrow sub-bands by dividing a half channel bandwidth from the central of the channel (e.g., the central six PRBs of the channel is named as sub-band #0 always) to one channel edge. In the fourth embodiment, one or more MTC narrow sub-bands are indicated by PHY control signaling, where the configured sub-bands are from a set of narrow sub-bands obtained by dividing half of the whole channel bandwidth from the central to one edge. More specifically, the division starts from the middle of the whole channel bandwidth, with a direction of going upward or going downward in frequency domain. The resource allocation overhead comes from the PHY control signaling that comprises an indicator that indicates the narrow sub-band index, which can be expressed as $m \times \lceil \log 2(N\_sub) \rceil$, $1 \leq m \leq N\_sub$ The RA overhead of the PHY control signaling comprises a resource size, a logical resource start index, a sub-band division direction, and an intra-sub-band shift value if enabled. The resource size requires 3 bits, the logical resource start index requires 3 bits, the sub-band division direction requires 1 bit, and the intra-sub-band shift value requires 3 bits. FIG. 14 illustrates resource allocation overhead for the fourth embodiment with one narrow sub-band and no frequency hopping.

Figure 15:
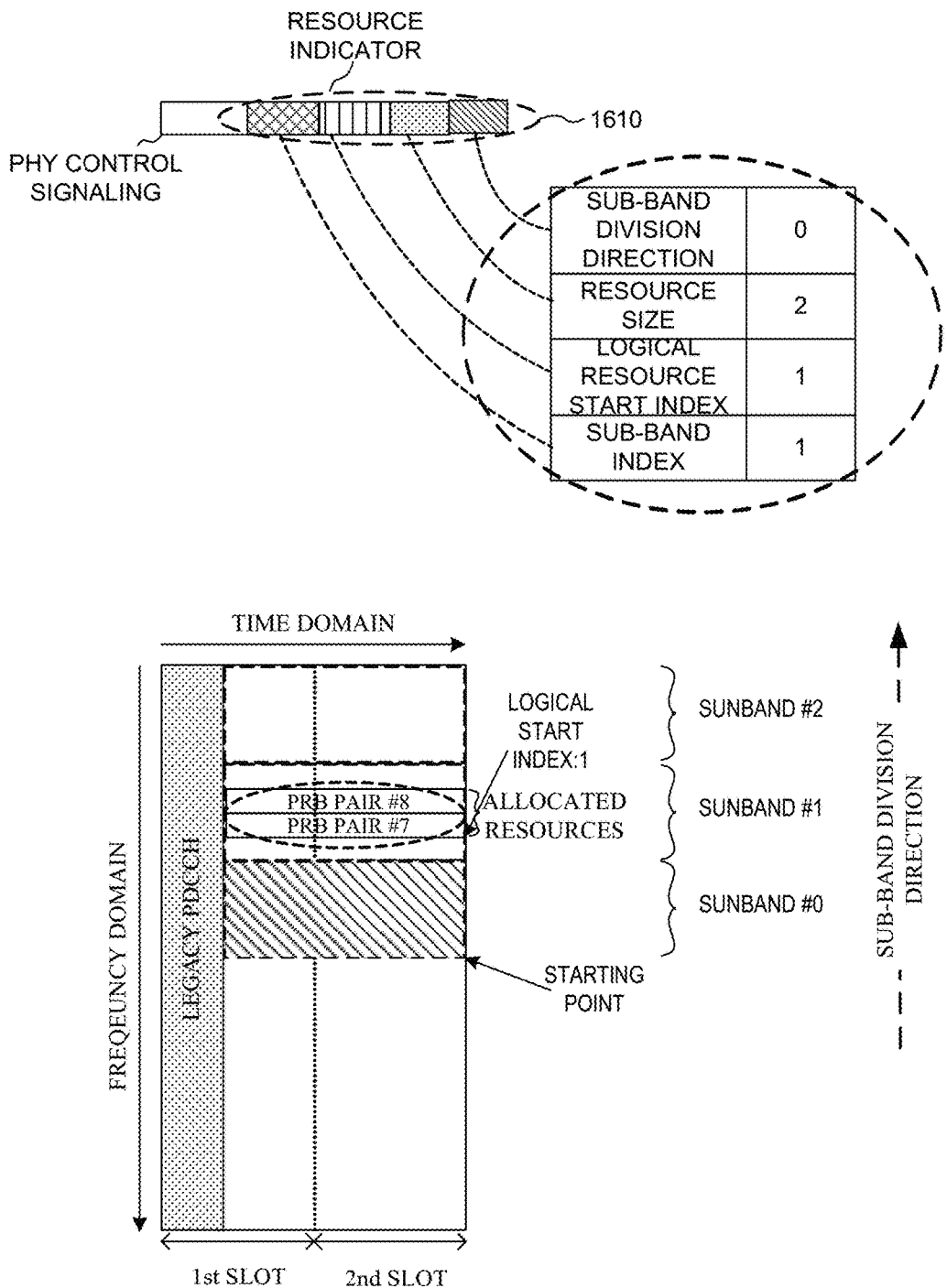
FIG. 15 illustrates one example of resource allocation design without frequency hopping for the fourth embodiment.
Figure 16:
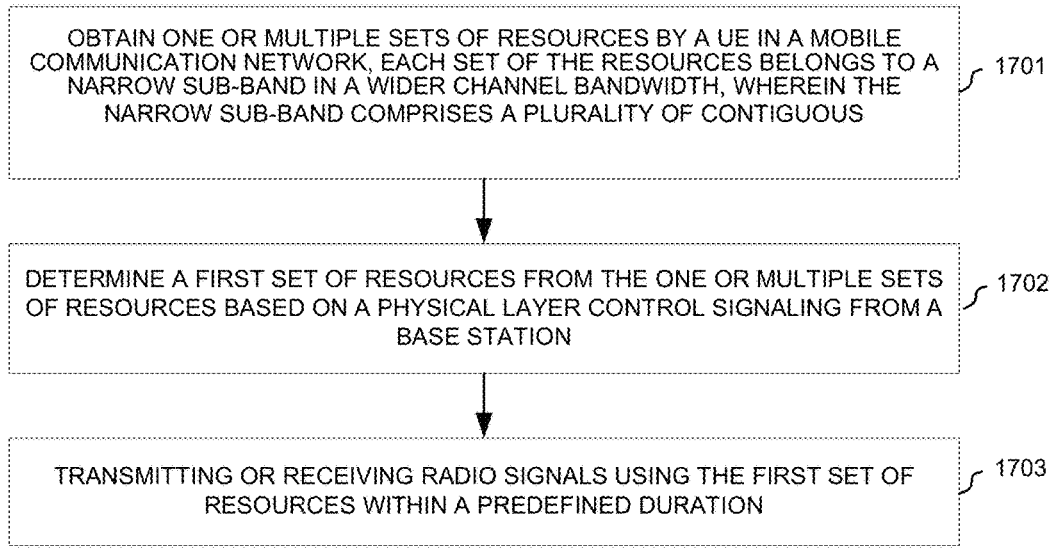
FIG. 16 is a flow chart of a method of resource allocation from UE perspective in accordance with one novel aspect.

FIG. 15 illustrates one example of resource allocation design without frequency hopping for the fourth embodiment. In the example of FIG. 16, a set of MTC narrow sub-bands is defined by dividing half of the entire channel bandwidth starting from the middle of the channel, e.g., sub-band #0, sub-band #1, and sub-band #2 as depicted in FIG. 15, and for sub-band #0, the index of PRBs are from 0 to 5, and for sub-band #1, the index of PRBs are from 6 to 11. The base station then transmits a PHY control signaling comprising a resource indicator 1610 via M-PDCCH. The resource indicator 1610 contains information of the sub-band division direction (0 means upward), the resource size (2 PRB pairs), the logical resource start index (1), and sub-band index (sub-band #1). Based on the predefined rule and the resource indicator, the UE is then able to determine PRB pair #12 and PRB pair #13 from MTC narrow sub-band #1 as the allocated resources for transmission/reception. Because only one sub-band is indicated and no indication for frequency hopping by a predefined rule, there is no frequency hopping in frequency domain.

FIG. 16 is a flow chart of a method of resource allocation from UE perspective in accordance with one novel aspect. In step 1701, a UE obtains one or multiple sets of resources in a mobile communication network. Each set of the resources belongs to a narrow sub-band in a wider channel bandwidth, which comprises a plurality of contiguous. In step 1702, the UE determines a first set of resources from the one or multiple sets of resources based on a physical layer control signaling from a base station. In step 1703, the UE transmits or receives radio signals using the first set of resources for a predefined duration. In a coverage extension mode, the UE determines a second set of resources according to a hopping pattern. The first and the second sets of resources belong to different radio subframes. The UE then transmits or receives radio signals using the second set of resources.

Figure 17:
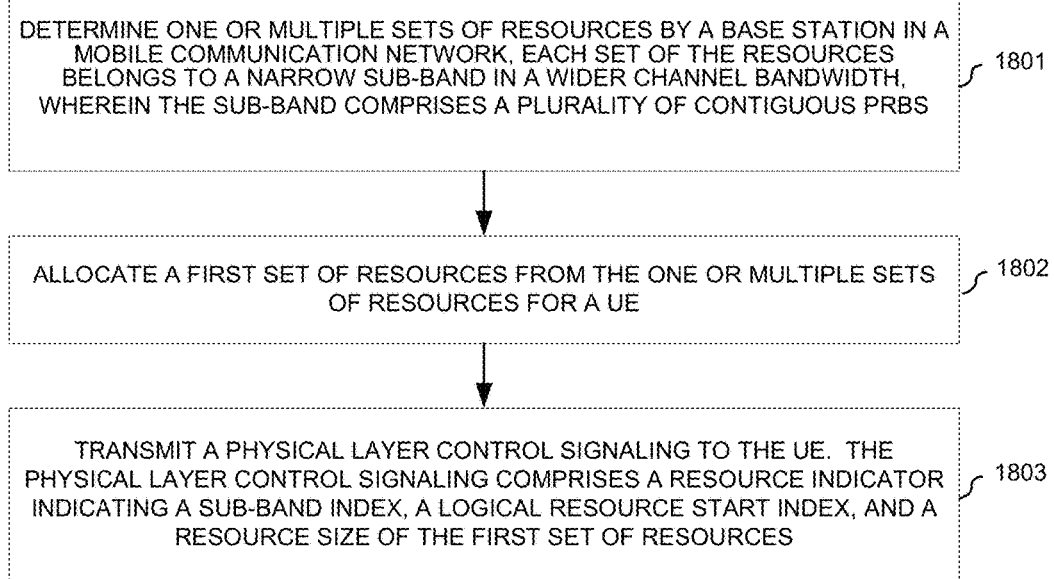
FIG. 17 is a flow chart of a method of resource allocation from eNB perspective in accordance with one novel aspect.

FIG. 17 is a flow chart of a method of resource allocation from eNB perspective in accordance with one novel aspect. In step 1801, a base station determines one or multiple sets of resources in a mobile communication network. Each set of the resources belongs to a narrow sub-band in a wider channel bandwidth, wherein each sub-band comprises a plurality of contiguous PRBs. In step 1802, the base station allocates a first set of resources from the one or multiple sets of resources for a UE. In step 1803, the base station transmits a physical layer control signaling to the UE. The physical layer control signaling comprises a resource indicator indicating a sub-band index, a logical resource start index, and a resource size of the first set of resources. In a coverage extension mode, the base station determines a frequency-hopping pattern for the UE. The base station then transmits an indication of the frequency-hopping pattern to the UE. The indication is contained in a higher layer message or in the physical layer control signaling.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining multiple sets of resources by a user equipment (UE) in a mobile communication network, wherein each set of resources belongs to a narrow sub-band in a wider channel bandwidth, and wherein the narrow sub-band comprises a plurality of contiguous physical resource blocks (PRBs);
   subsequently, determining a first set of resources from the multiple sets of resources based on a physical layer control signaling from a base station;
   transmitting or receiving radio signals using the first set of resources within a predefined duration;
   determining a second set of resources according to a hopping pattern, wherein the first and the second sets of resources belong to different radio subframes, and wherein a frequency shift value for the frequency hopping is a function of the first set of resources and a bundle index corresponding to the sequence of the hopping sequence.

2. The method of claim 1, wherein the UE is a low cost (LC) Machine-Type Communication (MTC) UE.

3. The method of claim 1, wherein the multiple sets of resources are obtained based on a predefined rule.

4. The method of claim 1, wherein the multiple sets of resources are obtained based on a higher layer message, and wherein the higher layer message is either cell-specific or UE-specific.

5. The method of claim 1, wherein the physical layer control signaling comprises a resource indicator indicating a sub-band index, a logical resource start index, and a resource size.

6. The method of claim 1, further comprising:
   transmitting radio signals using the second set of resources in a coverage extension mode.

7. The method of claim 6, wherein the hopping pattern is based on a higher layer message.

8. The method of claim 6, wherein the hopping pattern is indicated by the physical layer control signaling.

9. A user equipment (UE), comprising:
   a resource configuration module that obtains multiple sets of resources by a user equipment (UE) in a mobile communication network, wherein each set of resources belongs to a narrow sub-band in a wider channel bandwidth, and wherein the narrow sub-band comprises a plurality of contiguous physical resource blocks (PRBs), wherein the resource configuration module also receives a physical layer control signaling from a base station and thereby determining a first set of resources from the one or multiple sets of resources and determines a second set of resources according to a hopping pattern, wherein the first and the second sets of resources belong to different radio subframes, and wherein a frequency shift value for the frequency hopping is a function of the first set of resources and a bundle index corresponding to the sequence of the hopping sequence; and
   a transceiver that transmits or receives radio signals using the first set of resources within a predefined duration.

10. The UE of claim 9, wherein the UE is a low cost (LC) Machine-Type Communication (MTC) UE.

11. The UE of claim 9, wherein the multiple sets of resources are obtained based on a predefined rule.

12. The UE of claim 9, wherein the multiple sets of resources are obtained based on a higher layer message, and wherein the higher layer message is either cell-specific or UE-specific.

13. The UE of claim 9, wherein the physical layer control signaling comprises a resource indicator indicating a sub-band index, a logical resource start index, and a resource size.

14. The UE of claim 9, wherein the UE determines a second set of resources according to a hopping pattern and transmits radio signals using the second set of resources in a coverage extension mode, wherein the first and the second sets of resources belong to different radio subframes.

15. A method comprising:
   determining multiple sets of resources by a base station in a mobile communication network, wherein each set of resources belongs to a narrow sub-band in a wider channel bandwidth, and wherein the narrow sub-band comprises a plurality of contiguous physical resource blocks (PRBs);

allocating a first set of resources from the multiple sets of resources for a user equipment (UE);

allocating a second set of resources according to a hopping pattern, wherein the first and the second sets of resources belong to different radio subframes, and wherein a frequency shift value for the frequency hopping is a function of the first set of resources and a bundle index corresponding to the sequence of the hopping sequence; and transmitting a physical layer control signaling to the UE, wherein the physical layer control signaling comprises a resource indicator indicating a sub-band index, a logical resource start index, and a resource size of the first set of resources.

16. The method of claim 15, wherein the UE is a low cost (LC) Machine-Type Communication (MTC) UE.

17. The method of claim 15, wherein the multiple sets of resources are determined based on a predefined rule.

18. The method of claim 15, wherein the multiple sets of resources are obtained based on a higher layer message, and wherein the higher layer message is either cell-specific or UE-specific.

19. The method of claim 15, further comprising:
determining the frequency hopping pattern for a coverage extension mode of the UE; and
transmitting an indication of the frequency hopping pattern to the UE, wherein the indication is contained in a higher layer message or in the physical layer control signaling.

* * * * *